United States Patent
Curry et al.

(10) Patent No.: US 10,706,413 B2
(45) Date of Patent: Jul. 7, 2020

(54) SYSTEM AND METHOD FOR CLOSING PRE-AUTHORIZATION AMOUNTS ON A VIRTUAL TOKEN ACCOUNT

(71) Applicant: American Express Travel Related Services Company, Inc., New York, NY (US)

(72) Inventors: Jeremiah Curry, St. George, UT (US); Vivekanandan Vaithinathan, South Jordan, UT (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 839 days.

(21) Appl. No.: 15/080,993

(22) Filed: Mar. 25, 2016

(65) Prior Publication Data
US 2017/0278099 A1 Sep. 28, 2017

(51) Int. Cl.
*G06Q 20/36* (2012.01)
*G06Q 40/02* (2012.01)
*G06Q 20/40* (2012.01)

(52) U.S. Cl.
CPC ....... *G06Q 20/3674* (2013.01); *G06Q 20/403* (2013.01); *G06Q 20/4012* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 9,741,077 B2 * | 8/2017 | Shakkarwar | G06Q 20/10 |
| 2009/0076966 A1 * | 3/2009 | Bishop | G06Q 20/027 |
| | | | 705/67 |
| 2015/0254656 A1 * | 9/2015 | Bondesen | G06Q 20/227 |
| | | | 705/41 |
| 2015/0254663 A1 * | 9/2015 | Bondesen | G06Q 20/405 |
| | | | 705/44 |

FOREIGN PATENT DOCUMENTS

EP 2652687 A1 * 10/2013 ............. G06Q 30/06

* cited by examiner

*Primary Examiner* — Alexander G Kalinowski
*Assistant Examiner* — Blane A Lickteig
(74) *Attorney, Agent, or Firm* — Thomas | Horstemeyer, LLP

(57) ABSTRACT

A system for closing pre-authorization amounts on a virtual token account is disclosed. The system may receive a transaction authorization request for a virtual token. The virtual token may be associated with a parent transaction account, and have a virtual token ID, a token parameter, a virtual token balance, an authorized variance, and a settlement variance. The transaction authorization request may have a transaction request amount and be linked to the virtual token ID. The system may compare the transaction request amount to the virtual token balance and the authorized variance, and authorize the transaction authorization request in response to the transaction request amount being less than the virtual token balance. The system may compare the settlement variance to the virtual token balance, and expire the virtual token in response to the virtual token balance being less than the settlement variance.

11 Claims, 4 Drawing Sheets

US 10,706,413 B2

SYSTEM AND METHOD FOR CLOSING PRE-AUTHORIZATION AMOUNTS ON A VIRTUAL TOKEN ACCOUNT

FIELD

The disclosure generally relates to virtual token accounts, and more specifically, to systems and methods for closing pre-authorization amounts on a virtual token account.

BACKGROUND

Owners and/or administrators of a transaction account may issue a virtual token linked to their transaction account. The virtual token may allow the owner and/or administrator to provide a virtual payment mechanism for a limited authorized monetary amount and for a limited duration. Typically, a greater pre-authorization amount must be added to the limited authorized amount, as a small increase in the transaction amount on the virtual token would cause the transaction to decline. For example, the transaction amount may be slightly increased due to a variation in currency (e.g., exchange rate between two currencies), taxes, shipping, and/or other similar types of variances. After the transaction is authorized, the monetary difference between the charge and the pre-authorization amount is left on the virtual token. The virtual token may stay active until a predefined expiration date. The unused monetary difference may expose the transaction account owner to fraudulent charges. In the corporate context (or other similar contexts with large-scale transactions), thousands of virtual token transactions may occur daily, exposing millions of dollars to fraud.

SUMMARY

In various embodiments, systems, methods, and articles of manufacture (collectively, the "system") for closing pre-authorization amounts on a virtual token account are disclosed. The system may have an authorization engine in electronic communication with an accounts receivable database. The authorization engine may receive a transaction authorization request for a virtual token. The virtual token may be associated with a parent transaction account. The virtual token may comprise a virtual token ID, a token parameter, a virtual token balance, an authorized variance, and a settlement variance. The transaction authorization request may comprise a transaction request amount, and may be linked to the virtual token ID. The authorization engine may compare the transaction request amount to the virtual token balance. The authorization engine may authorize the transaction authorization request in response to the transaction request amount being less than the virtual token balance and the authorized variance. The authorization engine may compare the transaction request amount to the virtual token balance. The authorization engine may authorize the transaction authorization request in response to the transaction request amount being less than the virtual token balance and the authorized variance. The authorization engine may compare the settlement variance to the virtual token balance. The authorization engine may expire the virtual token in response to the virtual token balance being less than the settlement variance.

In various embodiments, the system may generate an authorized variance transaction history. The authorized variance transaction history may comprise data relating to the authorizing of transaction authorization requests. The system may alter the authorized variance based on the authorized variance transaction history.

In various embodiments, the system may generate a settlement variance transaction history. The settlement variance transaction history may comprise data relating to the expiring of virtual tokens. The system may alter the settlement variance based on the settlement variance transaction history.

In various embodiments, the token parameter may comprise a time period for the transaction, a geographic location for the transaction, or a merchant category. The transaction authorization request comprises a merchant category code, a service establishment number, a geographic location code, a product code, or a POS terminal number.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
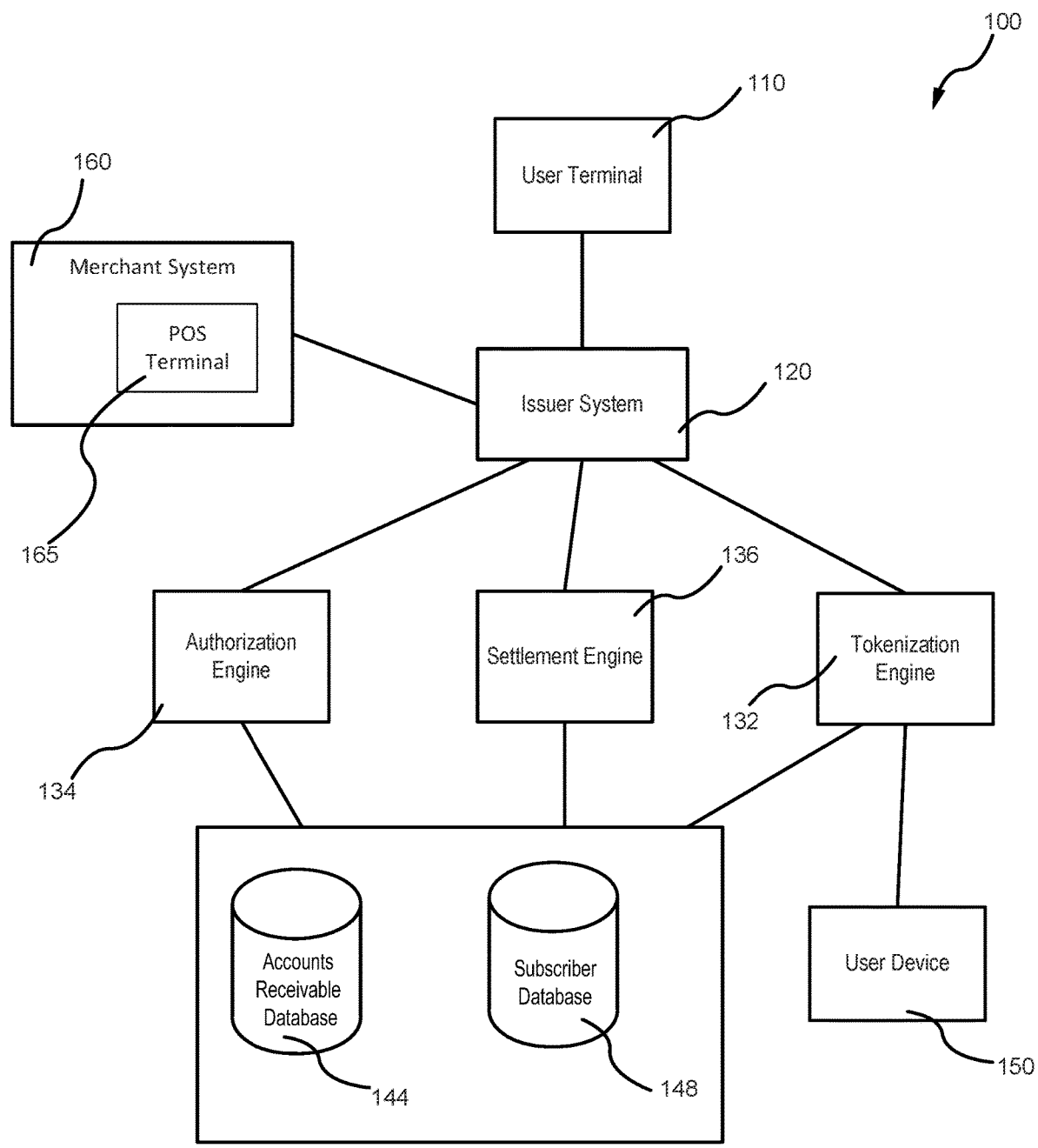
FIG. 1 is a block diagram illustrating various system components of a system for closing pre-authorization amounts on a virtual token account, in accordance with various embodiments.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the system may include alerting a user when their computer is offline. The system may include generating customized information and alerting a remote user that the information can be accessed from their computer. The alerts are generated by filtering received information, building information alerts and formatting the alerts into data blocks based upon user preference information. The data blocks are transmitted to the user's wireless device which, when connected to the computer, causes the computer to auto-launch an application to display the information alert and provide access to more detailed information about the information alert. More particularly, the system may comprise providing a viewer application to a user for installation on the remote user computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote user computer and to enable connection via the URL to the data source over the Internet when the wireless device is locally connected to the remote user computer and the remote user computer comes online.

In various embodiments, the system may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the system may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus, when a user requests or interacts with virtual tokens. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

In various embodiments, the system may be configured to close the pre-authorization amount on a virtual token based on a settlement variance. The system may decrease the exposure to fraud in virtual tokens by expiring the virtual token to cause the system to no longer authorize further payment requests for the virtual token. In this regard, the system may expire tokens based on a settlement variance defined by a user during setup of virtual tokens on a parent transaction account. When a settlement occurs from a merchant on a virtual token and causes the available pre-authorization amount of the virtual token to become less than the settlement variance, the authorization system may expire the virtual token to prevent further authorizations of purchases and transactions on the virtual token. Moreover, by expiring the virtual token, system 100 may benefit transaction accounting for the virtual token, as it will be clear whether there are any more transaction authorization requests coming through for the virtual token. Benefits of the present disclosure may apply to any suitable use of virtual tokens. For example, the present disclosure may apply in corporate contexts, as well as in consumer use of virtual tokens.

In various embodiments, and with reference to FIG. 1, system 100 may comprise a user terminal 110, an issuer system 120, a tokenization engine 132, an authorization engine 134, a settlement engine 136, an accounts receivable database 144, a subscriber database 148, a user device 150, and a merchant system 160. Merchant system 160 may comprise a point-of-sale ("POS") terminal 165. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, user terminal 110 may comprise hardware and/or software capable of allowing a user, program administrator, parent transaction account owner, merchant and/or the like, access to system 100. For example, user terminal 110 may comprise any suitable device allowing a user to communicate with a network, such as a personal computer, personal digital assistant, cellular phone, kiosk, and/or the like. User terminal 110 may allow a user to communicate with issuer system 120 to setup virtual tokens, request to generate a virtual token, review authorized variance transaction history, review settlement variance transaction history, and/or any other suitable task. User terminal 110 may be in electronic and/or operative communication with issuer system 120.

In various embodiments, issuer system 120 may be configured as a central hub to access various systems, engines, and components of system 100. Issuer system 120 may comprise a network, computer-based system, and/or software component configured to provide an access point to various systems, engines, and components. Issuer system 120 may be in operative and/or electronic communication with user terminal 110, tokenization engine 132, authorization engine 134, settlement engine 136, and/or merchant system 160. In this regard, issuer system 120 may allow communication from user terminal 110 to systems, engines, and components of system 100. Issuer system 120 may receive a request from user terminal 110 to setup account access for virtual tokens. Issuer system 120 may also receive from user terminal 110 a request to generate and transmit a virtual token. Issuer system 120 may also allow communication from merchant system 160 to systems, engines, and components of system 100.

In various embodiments, issuer system 120 may be configured to setup a parent transaction account for use with virtual tokens. Issuer system 120 may receive a virtual token setup request from user terminal 110. The virtual token setup request may comprise a request to setup a parent transaction account for use with issuing virtual tokens. Issuer system 120 may prompt user terminal 110 to input and/or select an authorized variance and a settlement variance for use with a virtual token. In various embodiments, issuer system 120 may prompt user terminal 110 via a webpage user interface. Issuer system 120 may also prompt user terminal 110 via a web service call, such as, for example, a web service call complying with Simple Object Access Protocol ("SOAP") or Representational State Transfer ("REST") communication protocols. Issuer system 120 may also receive the authorized variance and/or the settlement variance via a batch file sent by user terminal 110. In that regard, user terminal 110 may transmit the batch file when prompted by issuer system 120. Issuer system 120 may communicate with authorization engine 134 to setup virtual token access. In this regard, issuer system 120 may transmit the parent transaction account number, the authorized variance, and the settlement variance to authorization engine 134. Authorization engine 134 may then store the authorized variance and the settlement variance locally. Storing the authorized variance and the settlement variance for the parent transaction account locally may allow authorization engine 134 to authorize, or decline, a transaction authorization request before prior transactions of the virtual account are settled against the parent transaction account.

In various embodiments, issuer system 120 may prompt user terminal 110 to input an authorized variance for the use of virtual tokens. The authorized variance may comprise an allowable increase in the authorized amount of a virtual token. During a virtual token transaction, in response to the transaction amount being greater than the authorized amount on the virtual token, the transaction will decline. This may cause a problem where small increases from the authorized amount caused by variation in currency (e.g., exchange rate between two currencies), taxes, shipping, and/or other similar types of variances, may nonetheless result in the transaction declining. The authorized variance may be used to allow for small increases from the authorized amount during virtual token transactions, such that the transaction would still be authorized.

In various embodiments, the authorized variance may be input to comprise a percentage of the authorized amount of a virtual token. For example, the authorized variance may comprise a percentage value of the authorized amount of the virtual token, such as, 5%, 10%, 20%, 30%, 50%, and/or any other suitable and/or desired value. The authorized variance may also be input as a specific monetary value. For example, the authorized variance may comprise a monetary value above the authorized amount of the virtual token. In this regard, the authorized variance may comprise any desired monetary value, such as $5.00, $10.00, $20.00, $50.00, $100.00, and/or any other suitable and/or desirable monetary value.

In various embodiments, issuer system 120 may also prompt user terminal 110 to input a settlement variance for use with virtual tokens. Issuer system 120 may prompt user terminal 110 during virtual token account setup. The settlement variance may comprise a monetary value or percentage fluctuation in the settlement of the virtual token. The settlement variance may comprise a threshold value within the authorized amount of a virtual token, wherein in response to that threshold value being met, authorization engine 134 may be configured to expire the virtual token. "Expire", as used in this context, may comprise marking the virtual token as inactive, wherein the virtual token may no longer be authorized for further transaction authorization requests, but may still be settled by settlement engine 136. In various embodiments, expiring the virtual token may cause future transaction authorization requests to fail, the same as if there were no preauthorization record for the virtual token. The settlement variance may comprise a monetary value, such as $5.00. For example, in response to a virtual token having an authorized amount of $100 and authorization engine 134 receiving a transaction authorization request having a transaction request amount of $97.00, authorization engine 134 may calculate the virtual token balance as $3.00, after settlement. Authorization engine 134 may compare the virtual token balance to the settlement variance, and, recognizing that the virtual token balance is less than the settlement variance, authorization engine 134 may expire the virtual token. The settlement variance may comprise any suitable monetary value, such as $10.00, $20.00, $50.00, $100.00, and/or any other desired monetary value. The settlement variance may also comprise a percentage value, such as 10%. For example, in response to the virtual token having an authorized amount of $100 and authorization engine 134 receiving a transaction authorization request having a transaction request amount of $91.00, authorization engine 134 may calculate the virtual token balance as $9.00, after settlement. The settlement variance of 10% applied to the authorized amount of $100 would yield a settlement threshold within $10.00 of the authorized amount. Authorization engine 134 may compare the virtual token balance to the settlement variance, and, recognizing that the virtual token balance is within the settlement variance, authorization engine 134 may expire the virtual token. The settlement variance may comprise any suitable percentage value, such as 20%, 30%, 40%, 50%, and/or any other suitable and/or desired percentage value.

In various embodiments, tokenization engine 132 may be configured to generate a virtual token. Tokenization engine 132 may receive a request to generate a virtual token from user terminal 110, via issuer system 120. Tokenization engine 132 may also be configured to transmit the virtual token. For example, tokenization engine 132 may transmit the generated virtual token to user device 150. Tokenization engine 132 may comprise and incorporate hardware and/or software components configured to generate and transmit the virtual token. Tokenization engine 132 may be in operative and/or electronic communication with issuer system 120, accounts receivable database 144, subscriber database 148, and/or user device 150.

In various embodiments, in response to receiving a request to generate a virtual token from issuer system 120, tokenization engine 132 may generate the virtual token. The virtual token may have a virtual token ID for identification. The virtual token may be associated with the parent transaction account, via the virtual token ID, and may comprise various token parameters. The token parameters may comprise various authorization limits on the virtual account, such as, for example, an authorized amount, time period for the transaction, geographic location for the transaction, merchant category, and/or the like. The virtual token may also comprise a virtual token balance representing the current monetary balance on the virtual token. The virtual token may also comprise the authorized variance and the settlement variance. In that regard, the request to generate the virtual token from issuer system 120 may comprise the authorized variance and the settlement variance, such that the virtual token may be generated having the authorized variance and the settlement variance. After generating the virtual token, tokenization engine 132 may transmit the virtual token to user device 150.

In various embodiments, authorization engine 134 may incorporate various hardware and/or software components. Authorization engine 134 may be in operative and/or electronic communication with issuer system 120, accounts receivable database 144, and/or subscriber database 148. Authorization engine 134 may be configured to authorize the transaction authorization requests from merchant system 160. In that regard, merchant system 160 may communicate with authorization engine 134 to transmit transaction information. Authorization engine 134 may receive the transaction authorization request, and compare the transaction request amount to the virtual token balance. In response to the transaction request amount being within the virtual token balance, in addition to the authorized variance, authorization engine 134 may transmit an approved transaction to merchant system 160. Authorization engine 134 may communicate with accounts receivable database 144 to store and maintain data on authorized transactions. Authorization engine 134 may instruct accounts receivable database 144 to store the data on authorized transactions grouped by parent transaction accounts (such as by a user profile, transaction account number and/or the like).

In various embodiments, authorization engine 134 may be configured to track and maintain an authorized variance transaction history. The authorized variance transaction history may comprise data relating to transactions that are authorized or declined based on the authorized variance. For example, the authorized variance transaction history may comprise data on transactions that were declined due to the authorized variance not having a high enough value (e.g., the authorized amount of $100.00, the authorized variance of $10.00, and the transaction request amount of $115.00, where $15.00 was added on due a currency exchange). The authorized variance transaction history may also comprise data on transactions that were authorized due to the authorized variance (e.g., the authorized amount of $100.00, the authorized variance of $10.00, and the transaction request amount of $105.00, where $5.00 was added on due a currency exchange). In this regard, the authorized variance transaction history may be used by system 100 to determine whether the authorized variance comprises an amount that is too low to fit the typical transactions of the virtual tokens, or an amount that is too high, leaving additional funds on the virtual token at risk. In various embodiments, authorization engine 134 may use the authorized variance transaction history to update the authorized variance based on an analysis of the data. Authorization engine 134 may also send a notification (e.g., a text message, e-mail, and/or the like), via issuer system 120, to user terminal 110 to display the authorized variance transaction history to the user.

In various embodiments, authorization engine 134 may be configured to track and maintain a settlement variance transaction history. The settlement variance transaction history may comprise data relating to virtual token transactions. For example, the settlement variance transaction history may comprise data on virtual tokens that were expired by authorization engine 134. The settlement variance transaction history may also comprise data on virtual tokens that were not expired by authorization engine 134, but were near the settlement variance (where "near" in this context refers to +/−$5.00, $10.00, and/or any other desired value). In this regard, the settlement variance transaction history may be used by system 100 to analyze whether the settlement variance comprises an amount that is too low to fit the typical transactions of the virtual tokens, leaving the leftover virtual token balance at risk for fraud. The settlement variance transaction history may also be used by system 100 to analyze whether the settlement variance comprises an amount that is too high, such that virtual tokens are prematurely expired. In various embodiments, authorization engine 134 may use the settlement variance transaction history to update the settlement variance based on an analysis of the data. Authorization engine 134 may also send a notification (e.g., a text message, e-mail, and/or the like), via issuer system 120, to user terminal 110 to display the settlement variance transaction history to the user.

In various embodiments, authorization engine 134 may also be configured to generate a transaction report. Authorization engine 134 may also transmit, via issuer system 120, the transaction report to user terminal 110. The transaction report may comprise data on virtual token transactions. For example, the transaction report may comprise a listing of virtual token IDs, and the corresponding transactions that were approved or denied. The transaction report may also comprise the settlement variance transaction history and/or the authorized variance transaction history.

In various embodiments, settlement engine 136 may be configured to process transaction information. Settlement engine 136 may process payment information by communicating with accounts receivable database 144 to recall data on authorized transactions for a parent transaction account. Settlement engine 136 may also, in response to a successful payment transaction, send a transaction confirmation to merchant system 160, via issuer system 120, notifying a merchant of a successful payment transaction. Settlement engine 136 may be in operative and/or electronic communication with issuer system 120, accounts receivable database 144, and/or subscriber database 148.

In various embodiments, accounts receivable database 144 may be configured to store and maintain transaction data relating to parent transaction accounts and virtual tokens. For example, accounts receivable database 144 may comprise transaction data such as the parent transaction account ID, transaction history, pending transactions, and/or the like. Accounts receivable database 144 may store the data using any suitable technique described herein or known in the art. Accounts receivable database 144 may be in operative and/or electronic communication with tokenization engine 132, authorization engine 134, and/or settlement engine 136.

In various embodiments, subscriber database 148 may be configured to store and maintain data on parent transaction account subscribers. In this regard, subscriber database 148 may store and maintain one or more user profiles, linking a user to the parent transaction account. For example, a user profile may comprise various profile indicia, such as parent transaction account information (e.g., account numbers), associated user accounts, user account access data (e.g., username, password, and/or the like), associated virtual tokens, and/or other such similar data. Subscriber database 148 may store the data using any suitable technique described herein or known in the art. Subscriber database 148 may be in operative and/or electronic communication with tokenization engine 132, authorization engine 134, and/or settlement engine 136.

In various embodiments, user device 150 may be configured to receive a virtual token. User device 150 may be in operative and/or electronic communication with tokenization engine 132, and may receive the virtual token from tokenization engine 132. User device 150 may also comprise a mechanism allowing a user to access and use the virtual token in a transaction. In this regard, user device 150 may comprise any suitable hardware and/or software components capable of sending and receiving data. For example, user device 150 may comprise a personal computer, personal digital assistant, cellular phone, kiosk, and/or the like. User device 150 may also comprise a near-field communication (NFC) enabled device, such as a smartphone (e.g., IPHONE®, BLACKBERRY®, and/or the like), a smartring, and/or the like. User device 150 may also be configured to store the virtual token in a mobile wallet, such as APPLE PAY™ ANDROID PAY™, GOOGLE WALLET™, and/or SAMSUNG PAY™.

In various embodiments, merchant system 160 may incorporate hardware and/or software components. Merchant system 160 may be configured to enable a merchant to receive a payment from a user, and submit a request to authorize the payment. Merchant system 160 may comprise a POS terminal 165 configured as a mechanism to conduct a transaction. In this regard, POS terminal 165 may enable a user to initiate a transaction with a merchant. For example, POS terminal 165 may comprise a cashier station, a credit or debit card reader, and/or the like. POS terminal 165 may also comprise a near-field communication (NFC) terminal. In this regard, an NFC terminal may allow for the transfer of information to another NFC enabling device, such as, a mobile device. In various embodiments, POS terminal 165 may allow a user to pay a merchant using a virtual token stored on an NFC enabled mobile device (e.g., user device 150).

In response to a user initiating a transaction with a merchant through POS terminal 165, via user device 150, for example, the merchant may send a transaction authorization request for the virtual token to authorization engine 134, via issuer system 120. In various embodiments, POS terminal 165 may receive the virtual token from user device 150, and treat the virtual token as if it were any other type of transaction. The transaction authorization request may comprise transaction identification information, which may be standardized codes or numbers indicating the characteristics of the transaction (e.g., a merchant category code, a service establishment number, geographic location code, product code, POS terminal number, and/or the like), a transaction request amount, and/or a user profile identifier such as the virtual token ID (or a transaction account number, a user account, a user account number, and/or any other identifying information).

Figure 2:
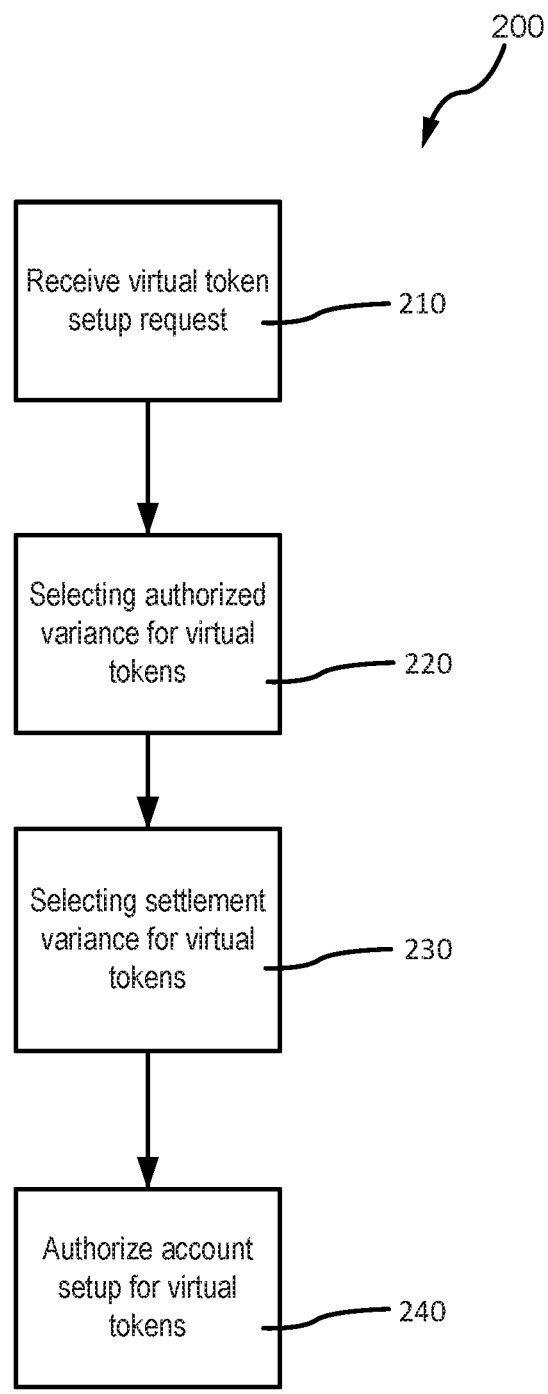
FIG. 2 illustrates a process flow for setting up virtual token access on a parent transaction account, in accordance with various embodiments.

In various embodiments, and with reference to FIG. 2, a method 200 for setting up virtual token access is disclosed. Method 200 may enable a user with a parent transaction account to set up use of virtual tokens through the parent transaction account. In various embodiments, method 200 may comprise receiving a virtual token setup request (step 210). The user may submit the virtual token setup request from user terminal 110, and the virtual token setup request may be received by issuer system 120. In various embodiments, issuer system 120 may prompt user terminal 110 via a webpage user interface. Issuer system 120 may also prompt user terminal 110 via a web service call, such as, for example, a web service call complying with SOAP or REST communication protocols. Issuer system 120 may also receive the authorized variance and/or the settlement variance via a batch file sent by user terminal 110.

In various embodiments, method 200 may comprise selecting an authorized variance for virtual tokens (step 220). Issuer system 120 may prompt the user, via user terminal 110, to input the authorized variance for generated virtual tokens. For example, issuer system 120 may prompt the user during setup of virtual tokens. The user may input the authorized variance having a monetary value or a percent value based on the authorized amount of a virtual token. In various embodiments, system 100 may also be configured to automatically update and/or alter the authorized variance. In this regard, system 100 may be configured to automatically update and/or alter the authorized variance based on an authorized variance transaction history. In various embodiments, method 200 may comprise selecting a settlement variance for virtual tokens (step 230). Issuer system 120 may prompt the user, via user terminal 110, to input the settlement variance for generated virtual tokens. The user may input the settlement variance having a monetary value or a percent value based on the authorized amount of a virtual token. In various embodiments, system 100 may also be configured to automatically update and/or alter the settlement variance. In this regard, system 100 may be configured to automatically update and/or alter the settlement variance based on a settlement variance transaction history.

In various embodiments, method 200 may comprise authorizing account setup for virtual tokens (step 240). Step 240 may comprise issuer system 120 transmitting data regarding the parent transaction account, and the authorized variance and the settlement variance, to subscriber database 148. Step 240 may also comprise issuer system 120 transmitting to authorization engine 134 data regarding the parent transaction account, and the authorized variance and the settlement variance. Authorization engine 134 may store the data locally, to enable authorization engine 134 to authorize, track, and expire virtual tokens in real time and without having to wait for the settlement of transactions.

Figure 3:
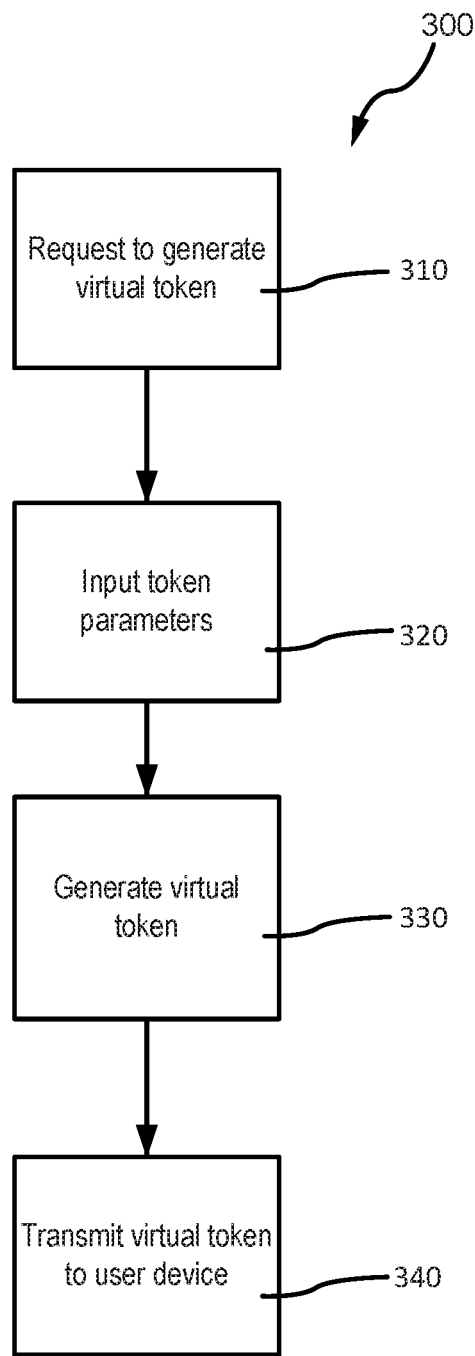
FIG. 3 illustrates a process flow for issuing a virtual token, in accordance with various embodiments.

In various embodiments, and with reference to FIG. 3, a method 300 of issuing a virtual token is disclosed. Method 300 may allow a user to request and generate a virtual token linked to a parent transaction account. In various embodiments, method 300 may comprise requesting to generate a virtual token (step 310). The user may submit a request to generate a virtual token via user terminal 110. In various embodiments, system 100 may also be configured to generate the virtual token through a system event not requiring user input. User terminal 110 may transmit the request via issuer system 120 to tokenization engine 132.

In various embodiments, method 300 may comprise inputting token parameters (step 320). In this regard, the user may be prompted, via user terminal 110, to input token parameters related to the virtual token. The token parameters may be transmitted to tokenization engine 132, via issuer system 120. In various embodiments, method 300 may comprise generating the virtual token (step 330). Step 330 may comprise tokenization engine 132 communicating with subscriber database 148 to retrieve transaction account information (e.g., the parent transaction account, the authorized variance, and the settlement variance) associated with the request to generate a virtual token. Tokenization engine 132 may generate the virtual token, wherein the virtual token is associated with the parent transaction account, via a virtual token ID, comprises the selected token parameters, a virtual token balance (e.g., the authorized value from the token parameters), the authorized variance, and the settlement variance. In various embodiments, method 300 may comprise transmitting the virtual token to a user device (step 340). Tokenization engine 132 may transmit the virtual token to user device 150. Tokenization engine 132 may transmit the virtual token to user device 150 corresponding with the recipient defined in the token parameters.

Figure 4:
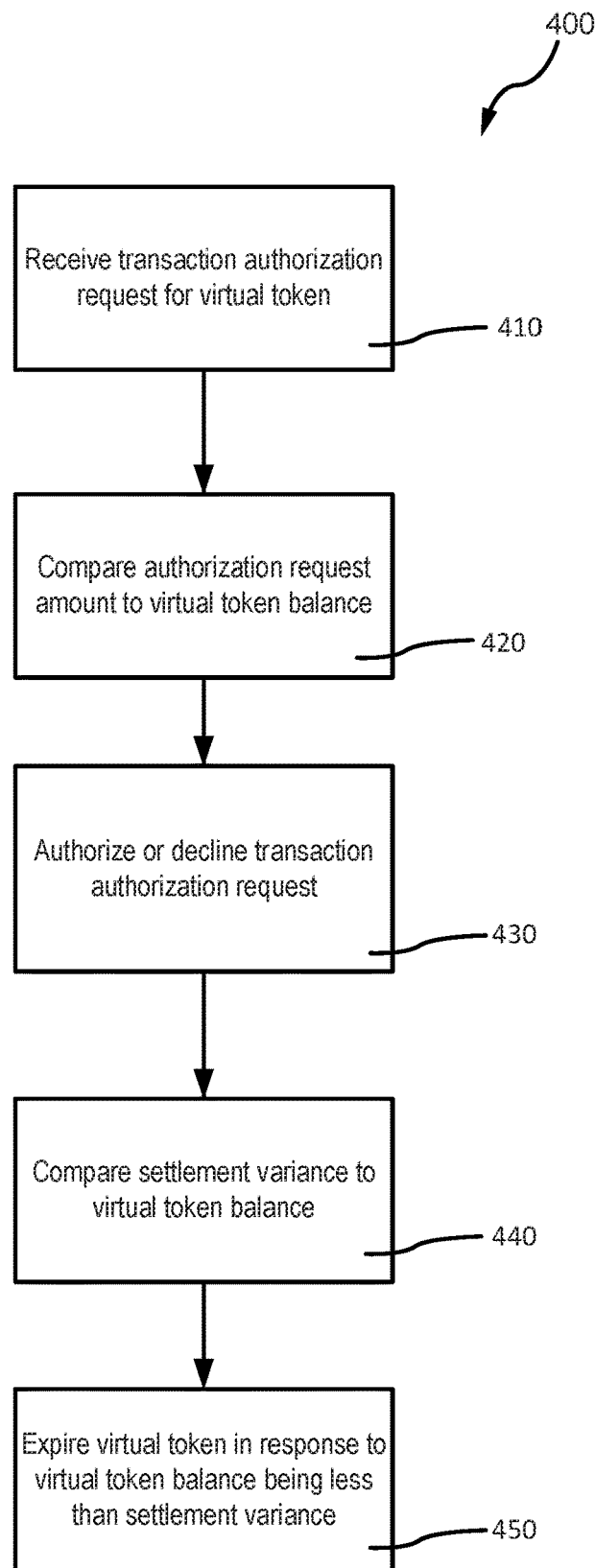
FIG. 4 illustrates a process flow for authorizing a virtual token payment request, in accordance with various embodiments.

In various embodiments, and with reference to FIG. 4, a method 400 of authorizing a virtual token payment request is disclosed. Method 400 may allow for system 100 to authorize the virtual token payment request from merchant system 160. Method 400 may also minimize the risk of fraud by expiring the virtual token in response to the virtual token balance being within the settlement variance. In various embodiments, method 400 may comprise receiving a transaction authorization request for a virtual token (step 410). In this regard, a user may use the virtual token on user device 150 to complete a transaction with a merchant, via POS terminal 165 of merchant system 160. Merchant system 160 may transmit the transaction authorization request to authorization engine 134, via issuer system 120. Authorization engine 134 may receive the transaction authorization request, and may locate corresponding virtual token account information linked to the transaction authorization request. In this regard, authorization engine 134 may retrieve the virtual token ID from the transaction authorization request, and retrieve locally the virtual token ID and corresponding data.

In various embodiments, method 400 may comprise comparing the transaction request amount to the virtual token balance (step 420). Authorization engine 134 may compare the transaction request amount to the virtual token balance. For example, the virtual token may comprise the authorized amount and the virtual token balance. Authorization engine 134 may compare the transaction request amount (e.g., the transaction amount requested by the merchant) to the virtual token balance.

In various embodiments, method 400 may comprise authorizing or declining the transaction authorization request (step 430). In response to the transaction request amount being greater than the virtual token balance, or greater than the virtual token balance combined with the authorized variance (e.g., the transaction request amount of $150.00 being greater than the virtual token balance of $100.00, and the authorized variance of $20.00), authorization engine 134 may deny the transaction authorization request. Authorization engine 134 may transmit to merchant system 160 a notification of the denial. In response to the transaction request amount being less than the virtual token balance, or less than the virtual token balance combined with the authorized variance (e.g., the transaction request amount of $50.00 being less than the virtual token balance of $100.00, and the authorized variance of $20.00), authorization engine 134 may accept the transaction authorization request. Authorization engine 134 may then transmit to merchant system 160 a notification of the acceptance. Authorization engine 134 may also transmit data to accounts receivable database 144 data regarding the accepted transaction. In various embodiments, step 430 may comprise generating an authorized variance transaction history. Authorization engine 134 may generate the authorized variance transaction history based on data relating to the authorizing of the transaction authorization request.

In various embodiments, method 400 may comprise comparing the settlement variance to the virtual token balance (step 440). Authorization engine 134 may compare the virtual token balance to the settlement variance associated with the parent transaction account. In this regard, authorization engine 134 may compare the virtual token balance to the settlement variance to determine whether the virtual token balance is greater than the settlement variance (e.g., the virtual token balance of $50.00 being greater than the settlement variance of $10.00, or the virtual token balance of $50.00 being greater than the settlement variance of 10%, where the authorized amount is $100.00), or less than the settlement variance (e.g., the virtual token balance of $5.00 being less than the settlement variance of $10.00, or the virtual token balance of $5.00 being less than the settlement variance of 10%, where the authorized amount is $100.00).

In various embodiments, method 400 may comprise expiring the virtual token in response to the virtual token balance being less than the settlement variance (step 450). In response to the virtual token balance being less than the settlement variance, as determined in step 440, authorization engine 134 may expire the virtual token. In this regard, authorization engine 134 may no longer accept transaction authorization requests for that virtual token. The virtual token will then be settled by settlement engine 136. In response to the virtual token balance being greater than the settlement variance, as determined in step 450, authorization engine 134 may continue to receive and accept transaction authorization requests for that virtual token. In various embodiments, step 450 may also comprise generating a settlement variance transaction history. Authorization engine 134 may generate the settlement variance transaction history, based on data relating to the expiring of the virtual tokens.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to an "entity" or "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account. In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

As used herein, the term "end user", "consumer", "customer", "cardmember", "business", "merchant", or "financial institution" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who may complete the payment transaction. In response to the verification being denied, the payment processor relays the information to the merchant, who may decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by a processor, and from an account holder of a parent transaction account, a request to associate a virtual token with the parent transaction account based on a virtual token ID;
receiving, by the processor, and from the account holder, an authorized variance for the virtual token and a settlement variance for the virtual token,
wherein the virtual token comprises the virtual token ID, a token parameter, a virtual token balance, the authorized variance, and the settlement variance;
generating, by the processor, a settlement variance transaction history that comprises token data relating to expiring of the virtual token;
altering, by the processor, the settlement variance based on the settlement variance transaction history;
receiving, by the processor, a transaction authorization request for the virtual token, wherein the transaction authorization request comprises a transaction request amount and is linked to the virtual token ID,
wherein the virtual token balance is an authorized amount on the virtual token less the transaction request amount, and
wherein the authorized variance includes an allowable increase in the authorized amount on the virtual token;
comparing, by the processor, the transaction request amount to the virtual token balance;
authorizing, by the processor, the transaction authorization request in response to the transaction request amount being less than the virtual token balance and the authorized variance;
generating, by the processor, an authorized variance transaction history, that comprises authorizing data relating to authorizing of the transaction authorization request;
altering, by the processor, the authorized variance based on the authorized variance transaction history;
comparing, by the processor, the settlement variance to the virtual token balance; and
expiring, by the processor, the virtual token in response to the virtual token balance being less than the settlement variance, wherein in response to the expiring, the virtual token is no longer authorized for the transaction authorization request, but the virtual token is still settled by a settlement engine.

2. The method of claim 1, wherein the token parameter comprises at least one of a time period for a transaction associated with the transaction authorization request, a geographic location for the transaction, or a merchant category.

3. The method of claim 2, wherein the transaction authorization request comprises at least one of a merchant category code, a service establishment number, a geographic location code, a product code, or a POS terminal number.

4. A system comprising: a processor; and
a tangible, non-transitory computer readable storage medium configured to communicate with the processor, the tangible, non-transitory computer readable storage medium having instructions stored thereon that, in response to execution by the processor, cause the processor to perform operations comprising:
receiving, by the processor, and from an account holder of a parent transaction account, a request to associate a virtual token with the parent transaction account based on a virtual token ID;
receiving, by the processor, and from the account holder, an authorized variance for the virtual token and a settlement variance for the virtual token,
wherein the virtual token comprises the virtual token ID, a token parameter, a virtual token balance, the authorized variance, and the settlement variance;
generating, by the processor, a settlement variance transaction history that comprises token data relating to expiring of the virtual token;
altering, by the processor, the settlement variance based on the settlement variance transaction history;
receiving, by the processor, a transaction authorization request for the virtual token,
wherein the transaction authorization request comprises a transaction request amount and is linked to the virtual token ID,
wherein the virtual token balance is an authorized amount on the virtual token less the transaction request amount, and
wherein the authorized variance includes an allowable increase in the authorized amount on the virtual token;
comparing, by the processor, the transaction request amount to the virtual token balance;
authorizing, by the processor, the transaction authorization request in response to the transaction request amount being less than the virtual token balance and the authorized variance;
generating, by the processor, an authorized variance transaction history that comprises authorizing data relating to authorizing of the transaction authorization request;
altering, by the processor, the authorized variance based on the authorized variance transaction history;
comparing, by the processor, the settlement variance to the virtual token balance; and
expiring, by the processor, the virtual token in response to the virtual token balance being less than the settlement variance,
wherein in response to the expiring, the virtual token is no longer authorized for the transaction authorization request, but the virtual token is still settled by a settlement engine.

5. The system of claim 4, wherein the token parameter comprises at least one of a time period for a transaction associated with the transaction authorization request, a geographic location for the transaction, or a merchant category.

6. The system of claim 4, wherein the transaction authorization request comprises at least one of a merchant category code, a service establishment number, a geographic location code, a product code, or a POS terminal number.

7. An article of manufacture including a non-transitory, tangible computer readable storage medium having instructions stored thereon that, in response to execution by a computer based system, cause the computer based system to perform operations comprising:
receiving, by the computer based system, and from an account holder of a parent transaction account, a request to associate a virtual token with the parent transaction account based on a virtual token ID;
receiving, by the computer based system, and from the account holder, an authorized variance for the virtual token and a settlement variance for the virtual token,
wherein the virtual token comprises the virtual token ID, a token parameter, a virtual token balance, the authorized variance, and the settlement variance;
generating, by the computer based system, a settlement variance transaction history, wherein the settlement variance transaction history comprises token data relating to expiring of the virtual token;

altering, by the computer based system, the settlement variance based on the settlement variance transaction history;

receiving, by the computer based system, a transaction authorization request for the virtual token, wherein the transaction authorization request comprises a transaction request amount and is linked to the virtual token ID, wherein the virtual token balance is an authorized amount on the virtual token less the transaction request amount, and wherein the authorized variance includes an allowable increase in the authorized amount on the virtual token;

comparing, by the computer based system, the transaction request amount to the virtual token balance;

authorizing, by the computer based system, the transaction authorization request in response to the transaction request amount being less than the virtual token balance and the authorized variance;

generating, by the computer based system, an authorized variance transaction history that comprises authorizing data relating to authorizing of the transaction authorization request;

altering, by the computer based system, the authorized variance based on the authorized variance transaction history;

comparing, by the computer based system, the settlement variance to the virtual token balance; and expiring, by the computer based system, the virtual token in response to the virtual token balance being less than the settlement variance, wherein in response to the expiring, the virtual token is no longer authorized for the transaction authorization request, but the virtual token is still settled by a settlement engine.

8. The article of manufacture of claim 7, wherein the token parameter comprises at least one of a time period for a transaction associated with the transaction authorization request, a geographic location for the transaction, or a merchant category.

9. The method of claim 1, further comprising transmitting the virtual token to a user device associated with the account holder.

10. The system of claim 4, further comprising transmitting the virtual token to a user device associated with the account holder.

11. The article of manufacture of claim 7, further comprising transmitting the virtual token to a user device associated with the account holder.

* * * * *